United States Patent [19]

Abe

[11] Patent Number: 5,226,031
[45] Date of Patent: Jul. 6, 1993

[54] METHOD OF REPRODUCING INFORMATION BY OPTICALLY SCANNING MARKS ON A RECORDING MEDIUM WITH COMPENSATION FOR NOISE COMPONENTS CAUSED BY MARKS ADJACENT A MARK BEING SCANNED

[75] Inventor: Michiharu Abe, Yokohama, Japan

[73] Assignee: Ricoh Company, Ltd., Tokyo, Japan

[21] Appl. No.: 668,081

[22] Filed: Mar. 12, 1991

[30] Foreign Application Priority Data

Mar. 14, 1990 [JP] Japan .................................. 2-63514
Aug. 10, 1990 [JP] Japan ................................ 2-213336

[51] Int. Cl.$^5$ .............................................. G11B 7/00
[52] U.S. Cl. ..................................... 369/124; 369/111
[58] Field of Search ................... 369/48, 54, 58, 59, 369/109, 110, 111, 124

[56] References Cited

U.S. PATENT DOCUMENTS 4,646,281 2/1987 Verboom ........................ 369/124 X
4,831,613 5/1989 Kanda ............................ 369/124 X
5,084,858 1/1992 Maeda ............................... 369/124
5,117,412 5/1992 Ito et al. ........................ 369/124 X Primary Examiner—W. R. Young
Attorney, Agent, or Firm—Cooper & Dunham

[57] ABSTRACT

A method of reproducing optical information by utilizing an optical information recording medium is disclosed, in which a timing mark is formed on each information track in the recording medium; an information mark is formed on each information track with a predetermined cycle at a predetermined distance from the timing mark, which is a starting point of the information mark; comprising the steps of (a) scanning the information track at a specified scanning speed using a light spot; (b) detecting physical changes caused by the timing marks and information marks in the light reflected or transmitted from the optical information recording medium; and (c) reproducing the optical information by determining the presence or absence of an information mark by performing particular calculations as described in the specification.

5 Claims, 1 Drawing Sheet

METHOD OF REPRODUCING INFORMATION BY OPTICALLY SCANNING MARKS ON A RECORDING MEDIUM WITH COMPENSATION FOR NOISE COMPONENTS CAUSED BY MARKS ADJACENT A MARK BEING SCANNED

BACKGROUND OF THE INVENTION

Field of the Invention

The present invention relates to a method of reproducing optical information, and more particularly to a method of reproducing optical information by utilizing an optical information recording medium, in which a timing mark is formed on each information track in the recording medium; an information mark is formed on each information track with a predetermined cycle at a predetermined distance from the timing mark, which is a starting point of the information mark; comprising the steps of (a) scanning the information track at a specified scanning speed using a light spot; (b) detecting physical changes caused by the timing marks and information marks in the light reflected or transmitted from the optical information recording medium; and (c) reproducing the optical information by determining the presence or absence of an information mark by performing particular calculations.

Discussion of Background

There is conventionally known a method of reproducing optical information, utilizing an optical information recording medium, in which a timing mark is formed on each information track in the recording medium; an information mark is formed on each information track with a predetermined cycle at a predetermined distance from the timing mark, which is a starting point of the information mark; the information track is scanned at a specified scanning speed using a light spot; physical changes caused by the timing marks and information marks are detected in the light reflected or transmitted from the optical information recording medium; and the optical information is reproduced according to the presence or absence of the information marks.

Recently, there have been efforts to improve the recording density of this type of optical information recording medium.

The recording density of an optical information recording medium may be improved by reducing the intervals between the information tracks and by reducing the positioning intervals of the information marks.

It is comparatively easy to reduce the intervals between the information tracks and the positioning intervals of the information marks, but it is not necessarily easy to correspondingly reduce the magnitude of the information mark itself and the diameter of the light spot.

If the intervals between the information tracks and the positioning intervals of the information marks are reduced in size relative to the diameter of the light spot, when the light spot illuminates the information to be reproduced, another information mark near the object information mark is also partly illuminated at the same time, adding a noise component to the reproduction signal of the object information mark, thereby causing interference and reducing the precision of the reproduction.

As a method of removing the interference caused by this type of noise component, a method is known whereby an analogue circuit is provided, and, after calculations are made to linearize the reproduced signal and its double-differentiated signal, the zero-cross time is detected, and jitter is reduced (Japanese Laid-Open Patent Application 60-107736).

A problem with this conventional method is that since no provision is made for the interference from the noise components from information marks on the adjacent information tracks, it is not possible to reduce the information track interval.

SUMMARY OF THE INVENTION

Accordingly, one object of the present invention is to provide, with due consideration to the drawbacks of such conventional methods, a method of reproducing optical information whereby the intervals between the information tracks and the positioning intervals of the information marks are both reduced and interference from the noise components is effectively alleviated This object is achieved by a method of reproducing optical information by utilizing an optical information recording medium, in which a timing mark is formed on each information track in the recording medium; an information mark is formed on each information track with a predetermined cycle at a predetermined distance from the timing mark, which is a starting point of the information mark; comprising the steps of (a) scanning the information track at a specified scanning speed using a light spot; (b) detecting physical changes caused by the timing marks and information marks in the light reflected or transmitted from the optical information recording medium; and (c) reproducing the optical information by determining the presence or absence of an information mark in a position (i, j) by performing the calculations:

$$S^*_{i,j} = S_{i,j} + \sum_{m=1}^{n1} (-k_1)^m (S_{i-m,j} + S_{i+m,j}) +$$

$$\sum_{m=1}^{n2} (-k_2)^m (S_{i,j-m} + S_{i,j+m}) +$$

$$\sum_{m=1}^{n3} (-k_3)^m (S_{i-m,j-m} + S_{i-m,j+m} + S_{i+m,j-m} + S_{i+m,j+m})$$

based on the detected values from adjacent tracks $j-1$, $j$, $j+1$, $$\ldots, S_{i-1,j-1}, S_{i,j-1}, S_{i+1,j-1}, S_{i+2,j-1}, \ldots,$$
$$\ldots, S_{i-1,j}, S_{i,j}, S_{i+1,j}, S_{i+2,j}, \ldots,$$
$$\ldots, S_{i-1,j+1}, S_{i,j+1}, S_{i+1,j+1}, S_{i+2,j+1}, \ldots,$$

which detected values are based on the discrete timings of $\ldots, t_{i-1}, t_i, t_{i+1}, t_{i+2}, \ldots$ corresponding to the scanning speed and the forming cycles of the information marks, with the timing mark as a starting point, wherein n1, n2, n3 are the positive integers 0, 1, or 2 or greater which satisfy the conditions $n1+n2+n3 \geq 1$; and k1, k2, k3 are interference coefficients which satisfy the condition $$0 < k_1 + k_2 + k_3 < 1$$

and

-continued $$\sum_{m=1}^{0} \text{(formula)} = 0.$$

The above n1, n2, n3, k1, k2, k3 are suitably determined experimentally to satisfy the above-mentioned conditions.

The above-mentioned physical changes which are detected in the light reflected or transmitted from the optical information recording medium as a result of the timing marks and information marks, include physical changes such as changes in intensity and changes in polarized light characteristics, such as Kerr rotation and Faraday rotation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
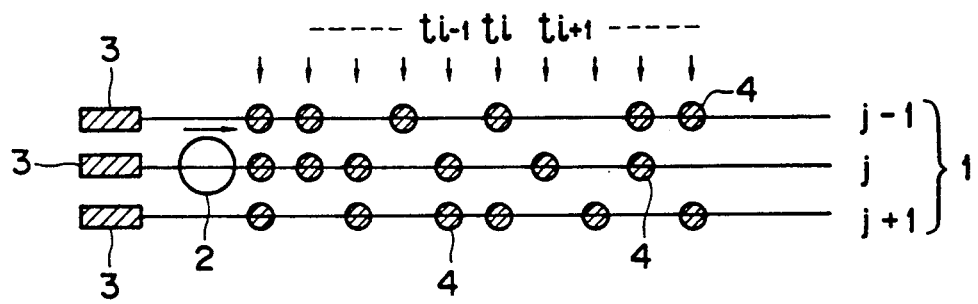
FIG. 1 is a diagram for explaining the present invention.

Now referring to FIG. 1, reference numeral 1 indicates an information track; reference numeral 2, a light spot; reference numeral 3, a timing mark; and reference numeral 4, an information mark.

The information tracks 1, as shown in the figure, are positioned from the top to the bottom of the figure. The information tracks 1 may be in the form of parallel lines, spiral lines, or concentric lines.

Three adjacent information tracks 1 are shown in the figure. These information tracks are numbered j−1, j, j+1, in order, from the top.

The light spot 2 is a laser beam concentrated to form a spot which is used for scanning.

The timing marks 3 and the information marks 4 are formed in the optical information recording medium. When these marks are illuminated by the light spot 2, physical changes are imparted to the reflected light or transmitted light, as previously noted. Accordingly, these marks are, specifically, reflective marks provided in a transparent substrate for the optical information recording medium, or, transparent marks provided in a reflective substrate for the optical information recording medium, or, marks with the characteristic of rotating the plane of polarization of reflected or transmitted light.

The timing marks 3 in this example, as shown in the figure, are formed positioned in one row in a direction normal to the direction in which the information tracks are arranged.

The information marks 4 are formed on each information track in a specified cycle from a position at a specified distance starting from the timing mark 3. Information is represented by the existence of the information mark 4. Accordingly, the positions at which the information marks 4 are to be formed on each information track 1 are predetermined from the relationship with the timing mark 3. An information mark may be formed or may not be formed at one of the positions, but the position at which the mark is supposed to be formed is determined in the above-mentioned specified cycle.

Accordingly, as shown in the figure, for example, when the jth information track is scanned at a predetermined scanning speed, the signals generated by the information marks on this information track after the predetermined time from the detection of the timing mark are generated corresponding to the times ... $t_{i-1}$, $t_i$, $t_{i+1}$ ... separated by a specified interval.

The statement that "the information marks are formed on each information track in a specified cycle from a position at a specified distance starting from the timing mark 3," means that the discrete timing ... $t_{i-1}$, $t_i$, $t_{i+1}$ ... which gives the timing of the above-mentioned signal generation as the basis for the detection of the timing marks, is set in common on all the information tracks or on a plurality of information tracks in series.

The above-mentioned discrete timing is determined so as to correspond to the scanning speed and the forming cycle of the information marks.

When any of the information tracks is scanned in this state, 0 to 8 adjacent information marks exist in the vicinity of one particular information mark.

Specifically, if the position of the ith information mark on the jth information track is assigned the position (i, j), there are eight other information-mark forming positions—(i−1, j), (i+1, j), (i, j−1), (i, j+1), (i+1, j−1), (i+1, j+1), (i−1, j−1), (i−1, j+1)—surrounding this position, and 0 to 8 information marks exist corresponding to the presence or absence of information marks at these positions.

If the information mark at the position (i, j) is illuminated by the light spot, in the case where the adjacent information marks are also illuminated to some extent, when a signal $S_{i,j}$ receives interference from the noise component of the adjacent information marks, this can normally be represented as follows:

$$S_{i,j} = S'_{i,j} + k_1(S'_{i-1,j} + S'_{i+1,j}) \qquad (1)$$
$$k_2(S'_{i,j-1} + S'_{i,j+1})$$
$$k_3(S'_{i-1,j-1} + S'_{i-1,j+1} +$$
$$S'_{i-1,j-1} + S'_{i+1,j+1})$$

wherein $S'_{i,j}$ indicates the reproduction signal level in the case where the information mark exists alone at the position (i, j) and the number of adjacent information marks is 0; $k_1$ is an interference coefficient which indicates the degree of interference from the adjacent information marks in front and in back on the same information track; $k_2$ and $k_3$ are interference coefficients which indicate the degree of interference from the adjacent information marks on the adjacent information tracks.

$k_1$ to $k_3$ are functions of the distance between the information mark at the position (i, j) and the adjacent information marks relating to $k_1$ to $k_3$, the light spot shape, the mark shape, and the like. However, if the above distance, and the positional relationship between the marks are the same, above distance and the mark interval is the same, each of $k_1$ to $k_3$ can be considered to have the same value.

If the signal $S'_{i,j}$ from the information mark at the position (i, j) is normalized to 1, the values of $k_1$ to $k_3$ are between 0 and 1.

The value of $S_{i,j}$ changes, depending on whether or not there is an information mark at the position (i, j) and depending on the number of information marks at the positions adjacent to the position (i, j).

At this time, considering the case where an information mark exists at the position (i, j) and the case where an information mark does not exist at the position (i, j), when the detected value $S_{i,j}$ in the case of existence is a minimum, the worst pattern I is obtained; when the detected value $S_{i,j}$ in the case of non-existence is a maximum, the worst pattern II is obtained.

The worst pattern I is the case where an information mark exists at the position (i, j) and there are no information marks in the positions adjacent to the position (i, j). The worst pattern II is the case where no information mark exists at the position (i, j) and there are eight information marks in the positions adjacent to the position (i, j).

When an information mark exists at the position (i, j) the detected value obtained for $S_{i,j}$ from Equation (1) becomes $$1+0 \leq S_{i,j} \leq 1+2k_1+2k_2+4k_3$$

and at the worst pattern I becomes 1.

When no information mark exists at the position (i, j) the detected value obtained for $S_{i,j}$ becomes $$0+0 \leq S_{i,j} \leq 0+2k_1+2k_2+4k_3$$

and at the worst pattern II becomes $2k_1+2k_2+4k_3$.

Accordingly, when there is no information mark at the position (i, j) the difference in the detected values for the worst patterns I, II (worst contrast) is $$1-(2k_1+2k_2+4k_3).$$

When the information mark 4 diameter is d, the light spot diameter D is 2d, and the information-mark positioning interval and the information track interval are both 2.8d, $k_1=k_2=0.15$, and $k_3=0.05$ approximately. At this time the worst contrast is less than 0.20 and errors in distinguishing the presence or absence of an information mark are easily produced.

By the method of the present invention, $S^*_{i,j}$ is calculated according to the following equation:

$$S^*_{i,j} = S_{i,j} + \sum_{m=1}^{n1} (-k_1)^m(S_{i-m,j} + S_{i+m,j}) + \qquad (2)$$

$$\sum_{m=1}^{n2} (-k_2)^m(S_{i,j-m} + S_{i,j+m}) +$$

$$\sum_{m=1}^{n3} (-k_3)^m(S_{i-m,j-m} + S_{i-m,j+m} + S_{i+m,j-m} + S_{i+m,j+m})$$

When n1=n2=n3=1, the value of $S^*_{i,j}$ in the above-mentioned worst pattern I becomes:

$$1-(2k_1+2k_2+4k_3)^2 \leq S^*_{i,j} \leq 1$$

and in the worst pattern II becomes:

$$0-(2k_1+2k_2+4k_3)^2 \leq S^*_{i,j} \leq 0$$

while the worst contrast is improved to:

$$1-(2k_1+2k_2+4k_3)^2 = 0.36$$

In the foregoing explanation, the combination of n1, n2, and n3, is shown in the example for the case where n1=n2=n3=1. However, other examples which can be given as desirable in practice include the combinations in which n1=1, n2=1, n3=0; n1=1, n2=0, n3=0; n1=0, n2=1, n3=0; n1=0, n2=1, n3=1; and the like.

A specific example of the present invention will now be explained.

Figure 2:
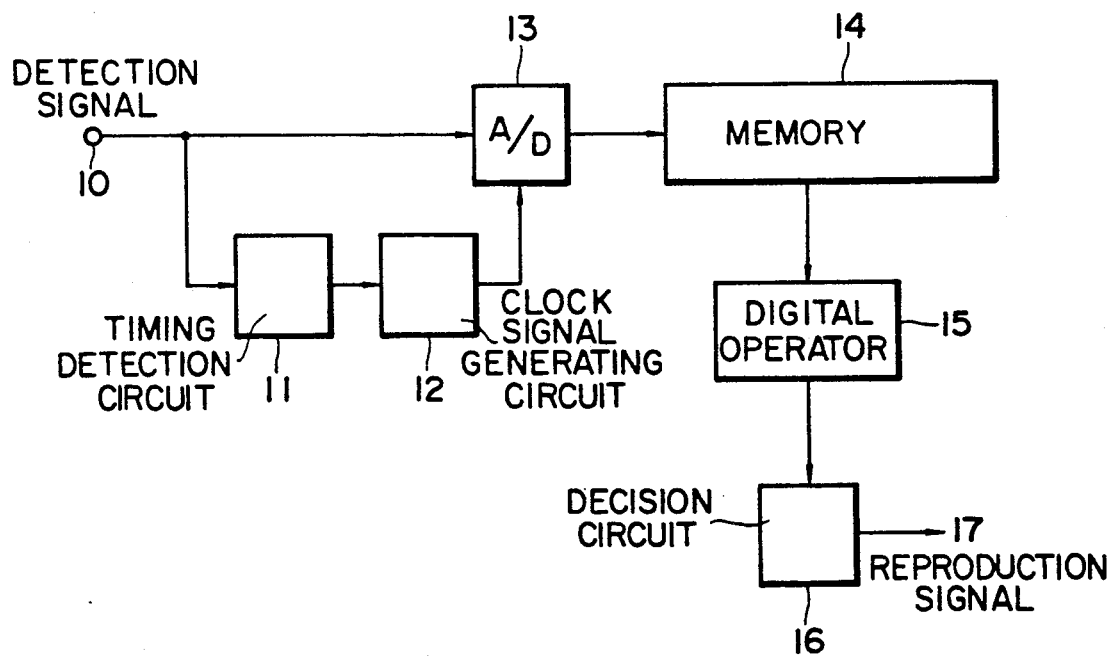
FIG. 2 is a diagram for explaining an embodiment of the present invention.

FIG. 2 is a block diagram showing an example of a circuit for implementing the present invention.

When a detection signal 10 detected by the light spot 2 is applied to a timing detection circuit 11, a timing mark 3 as shown in FIG. 1 is detected by the circuit 11. The detection circuit 11 activates a clock signal generating circuit 12 based on the detection timing of the timing mark, so that the detected signals at the predetermined timing ... $t_1, t_2, \ldots, t_{i-1}, t_i, t_{i+1} \ldots$ corresponding to the information-mark position are converted to digital signals for the detected values $S_i$, by means of an A/D converter 13.

The converted detected values $S_{i,j}$ are stored in a memory 14. Scanning is performed by the light spot 2, and when the detected values from at least three tracks have been stored in the memory 14, calculations are performed according to Equation (2) by a digital operator 15. The results of the operations are transmitted to a decision circuit 16. The decision circuit 16 judges the results of the operations from a suitable threshold value, such as an intermediate value of the presence or absence of a mark, or the like, or from the relative magnitude relationship of a mark signal, and outputs the presence or absence of the information mark 4 as a reproduction signal 17.

In the case where the information track is the first or the last track and there is no adjacent track on one side of that track, an imaginary adjacent track is assumed, the values detected on that imaginary track are all taken as zero, these values are stored in the memory 14, and the calculations of Equation (2) are performed.

FIG. 1 shows an example of a system where the information tracks are scanned successively by a single light spot from a single light beam, but it is aso acceptable to reproduce the information by scanning a plurality of information tracks simultaneously, using a plurality of light spots from a plurality of light beams, then applying the calculation method of the present invention.

As outlined above, the present invention provides a novel method of reproducing optical information.

With this method, from the configuration outlined above, the intervals between the optical tracks and the positioning intervals of the information marks are both reduced and the recording density of the optical information recording medium is improved so that it is possible to reproduce the information with high precision.

What is claimed is:

1. A method of reproducing optical information by utilizing an optical information recording medium, in which a timing mark is formed on each of a succession of information tracks in the recording medium; an information mark is formed on each information track with a predetermined cycle at a predetermined distance from the timing mark, which is a starting point of the information mark, such that there are a succession of information mark positions on each information track, and the ith information mark position starting from said timing mark on the jth information track is assigned a position (i, j); comprising the steps of (a) scanning the information tracks at a specified scanning speed using a light spot; (b) detecting physical changes caused by the timing marks and information marks in the light reflected or transmitted from the optical information recording medium; and (c) reproducing the optical information by determining the presence or absence of an information mark in the (i, j) position by performing the calculations:

$$S^*_{i,j} = S_{i,j} + \sum_{m=1}^{n1} (-k_1)^m (S_{i-m,j} + S_{i+m,j}) +$$

$$\sum_{m=1}^{n2} (-k_2)^m (S_{i,j-m} + S_{i,j+m}) +$$

$$\sum_{m=1}^{n3} (-k_3)^m (S_{i-m,j-m} + S_{i-m,j+m} + S_{i+m,j-m} + S_{i+m,j+m})$$

based on the detected values from adjacent tracks $j-1$, $j$, $j+1$, $$\ldots, S_{i-1,j-1}, S_{i,j-1}, S_{i+1,j-1}, S_{i+2,j-1}, \ldots,$$

$$\ldots, S_{i-1,j}, S_{i,j}, S_{i+1,j}, S_{i+2,j}, \ldots,$$

$$\ldots, S_{i-1,j+1}, S_{i,j+1}, S_{i+1,j+1}, S_{i+2,j-1}, \ldots,$$

which detected values are based on the discrete timings of $$\ldots, t_{i-1}, t_i, t_{i+1}, t_{i+2}, \ldots$$

corresponding to the scanning speed and the forming cycles of the information marks, with the timing mark as a starting point, wherein n1, n2, n3 are positive integers or 0 which satisfy the conditions $n1+n2+n3 \geq 1$; and k1, k2, k3 are interference coefficients which satisfy the condition $0 < k_1 + k_2 + k_3 < 1$ and $$\sum_{m=1}^{0} (\text{formula}) = 0.$$

2. The method of reproducing optical information as claimed in claim 1, wherein said physical changes caused by said timing marks and information marks in the light reflected or transmitted from said optical information recording medium are changes in the intensity of said light.

3. The method of reproducing optical information as claimed in claim 1, wherein said physical changes caused by said timing marks and information marks in the light reflected or transmitted from said optical information recording medium are changes in the polarized light characteristics of said light.

4. The method of reproducing optical information as claimed in claim 3, wherein said changes in the polarized light characteristics of said light are changes in Kerr rotation.

5. The method of reproducing optical information as claimed in claim 3, wherein said changes in the polarized light characteristics of said light are changes in Faraday rotation.

* * * * *